No. 820,227. PATENTED MAY 8, 1906.
R. T. J. MARTIN.
PRESSED METAL SEAT.
APPLICATION FILED MAR. 13, 1905.

WITNESSES:
Brennan B. West.
Cassie McElroy.

INVENTOR,
Robert T. J. Martin.
BY
Fouts & Hull,
ATTORNEYS

UNITED STATES PATENT OFFICE.

ROBERT T. J. MARTIN, OF ELYRIA, OHIO.

PRESSED-METAL SEAT.

No. 820,227. Specification of Letters Patent. Patented May 8, 1906.

Application filed March 13, 1905. Serial No. 249,946.

*To all whom it may concern:*

Be it known that I, ROBERT T. J. MARTIN, residing at Elyria, in the county of Lorain and State of Ohio, have invented a certain new and useful Improvement in Pressed-Metal Seats, of which the following is a full, clear, and exact description, reference being had to the accompanying drawings.

My invention relates to seats for agricultural machines, implements, vehicles, &c., that are made from sheet material, preferably light-gage sheet-steel, and has for its object the production at the least cost of a seat of this character that may be readily attached to a support and the provision of a seat of this character with a reinforcement secured thereto in an effective and economical manner.

Generally speaking, the invention may be defined as consisting of the combination of elements set forth in the specification and drawings and embodied more particularly in the claims hereto annexed.

Figure 1:
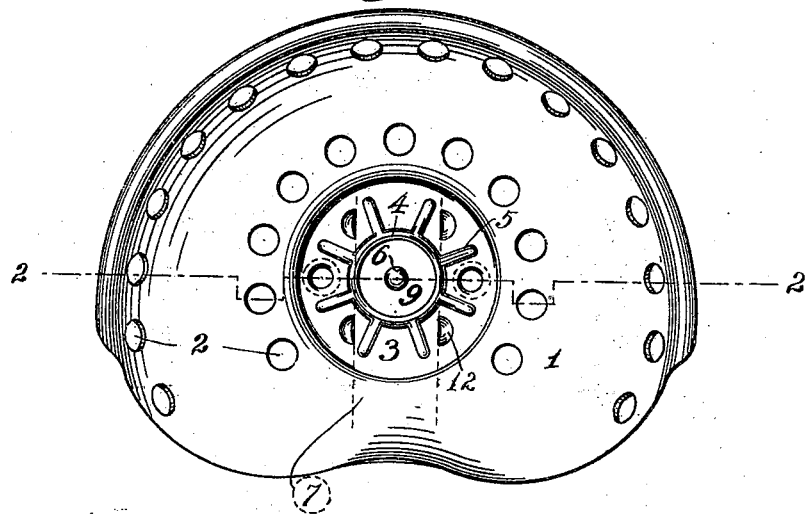
Figure 4:
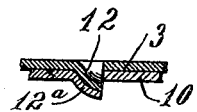
Figure 2:
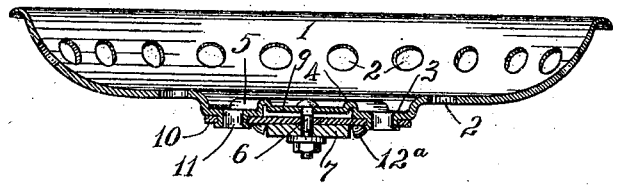
Figure 3:
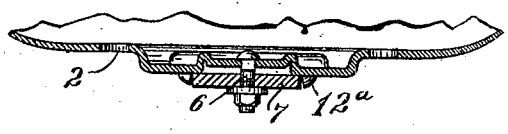

Referring to the drawings, Figure 1 represents a plan view of a seat constructed in accordance with my invention. Fig. 2 represents a sectional view of said seat on the line 2 2 of Fig. 1. Fig. 3 represents a similar view of the lower portion of such seat, showing the same as constructed without a reinforcing-plate; and Fig. 4 represents a sectional detail of the guides for the seat-support.

The seat 1 is formed from a blank of sheet metal, which is swaged to the desired shape, the metal increasing in thickness toward the center of the seat. This seat is provided with two or more rows of perforations 2, the outer row being located at a short distance from the rounded sides and back of the seat and the inner row being located at a short distance from the central portion of said seat. The perforations usually provided for seats of this character are elongated or irregularly-shaped slots, and the provision of slots of such shape not only weakens the seat-body, but results in a substantial loss of material, as the punchings from slots of such shape command only the price of scrap.

As will appear from an inspection of Fig. 1, the perforations which I employ are round or circular. These perforations are preferably about seven-eighths of an inch in diameter and are so arranged that the holes in the inner row are staggered as much as possible with those on the outer row, thus preserving the strength of the plate. A further and important point of advantage in circular perforations is that the punchings therefrom may be again punched in the central portion, making washers which sell at a very high figure as compared with the price obtainable from punchings as heretofore made, which are fit only for scrap, which commands but a small price. The provision of these perforations is not claimed broadly herein, but constitutes part of the invention described and claimed in an application pending concurrently herewith, Serial No. 311,264.

The portion 3 of the central portion of the seat is depressed, and the portion 9 of such center is provided with a circular bead or rib 4, from which radiates a series of ribs 5, projecting upwardly to the same level as the bead 4 and substantially to the same level as the top of the head of the bolt 6, by which the seat is secured to the spring 7 of the machine or vehicle. The bead or rib 4 and the radiating ribs 5 are located entirely within the central depression 3. As will appear from Fig. 2, the portion 3 (outside of the annular rib 4) is in a lower plane than the portion 9 within such rib, which is not depressed in forming the seat, whereby the seat and the load thereon may be entirely supported by such portion 3, as hereinafter set forth. Beyond the depressed portion 3 the seat rises again to substantially the level of the top of the bead and ribs and then extends upwardly and outwardly and downwardly to form the sides, back, and front of the seat.

In order to prevent the seat from twisting about on its support, it is necessary to provide the former with guides which will abut against the support and retain the seat in proper position thereon. These guides are formed by cutting through the metal of the seat and swaging said metal downwardly from the cut, thus forming spring-guide projections 12. These spring-guides, in addition to such function, provide means for draining the seat. Preferably beneath the central portion of the seat is secured the reinforcing-plate 10, and said reinforcing-plate is provided with a bolt-hole and spring-guides 12ª, corresponding and conforming to those in the seat.

To secure the reinforcing-plate 10 firmly in position, I punch two or more eyelets 11 from the portion 3 of the seat. The plate 10 is so punched as to place the same over such eyelets, which are upset against the lower surface of said reinforcing-plate, so as to secure the same to the seat. This forms a securing means for the plate which is particularly effective and economical, eliminating the cost of rivets which, prior to my invention, have been employed for this purpose. The openings made in forming the eyelets in the portion 3 of the seat provide means for draining the seat, it having been necessary heretofore to punch holes specially for that purpose.

Having thus described my invention, what I claim as new, and desire to secure by Letters Patent, is—

1. A seat made from sheet material, provided with a reinforcing-plate beneath the central portion, and eyelets formed from said central portion extending through said plate and upset against the surface thereof, substantially as specified.

2. A seat made from sheet material the central portion of which is surrounded by a depressed portion, said seat being provided with a reinforcing-plate below the depressed portion having openings therethrough and eyelets formed from said depressed portion, extending through said openings and upset against the surface of said plate, substantially as specified.

3. A seat made from sheet material having a central portion at a lower level than the body thereof, said seat being provided with a reinforcing-plate for such portion, and eyelets uniting said portion and said reinforcing-plate, substantially as specified.

4. A seat made from sheet material, the central portion of which is surrounded by a depressed annular portion, said seat being provided with a reinforcing-plate below such depressed portion and eyelets formed from such annular portion, extending through said plate and secured thereto, substantially as specified.

5. A seat made from sheet material, the central portion of which is surrounded by an annular depressed portion, said seat being provided with a reinforcing-plate engaging such annular portion, a seat-support engaging said reinforcing-plate, a bolt extending through the central portion, the reinforcing-plate and the seat-support, and eyelets formed in said depressed annular portion, extending through said reinforcing-plate and secured thereto, substantially as specified.

6. A seat made from sheet material provided with a reinforcing-plate beneath the central portion thereof, eyelets formed from said central portion extending through said plate and upset against the surface thereof, and projections struck from said central portion of the seat to form guides for the seat-support, substantially as specified.

7. A seat made from sheet material having a central portion at a lower level than the body thereof, said seat being provided with a reinforcing-plate for such portion, eyelets uniting said plate and said portion, and projections struck from said seat to form guides for the seat-support, substantially as specified.

8. A seat made from sheet material the central portion of which is surrounded by a depressed portion, said seat being provided with a reinforcing-plate below the depressed portion having openings therethrough, eyelets formed from said depressed portion extending through said openings and upset against the surface of said plate, and projections struck from said depressed portion to form guides for the seat-support, substantially as specified.

9. A seat made from sheet material the central portion of which is surrounded by a depressed annular portion, said seat being provided with a reinforcing-plate below such depressed annular portion, eyelets formed from said depressed annular portion extending through said plate and secured thereto, and alined projections cut from said plate and said depressed annular portion to form guides for the seat-support, substantially as specified.

10. A seat formed from a sheet of material having a raised bead that is substantially concentric with the point of attachment and a plurality of raised ribs extending from the said bead, a reinforcing-plate below said seat, projections that are struck from the seat to form guides for the seat-support, and eyelets struck from said seat between said ribs extending through said reinforcing-plate and upset against the lower surface thereof, substantially as specified.

11. A seat made from sheet material provided with a reinforcing-plate beneath the central portion thereof, eyelets formed from said central portion extending through said plate and upset against the surface thereof, and projections struck from said plate to form guides for the seat-support, substantially as specified.

12. A seat made from sheet material the central portion of which is surrounded by a depressed annular portion, said seat being provided with a reinforcing-plate for such depressed annular portion, eyelets formed from said depressed annular portion extending through said plate and secured thereto, and projections struck from said plate to form guides for the seat-support, substantially as specified.

13. A seat made from sheet material and provided with circular perforations extending therethrough, the metal surrounding some of said perforations being swaged downwardly to form eyelets, substantially as specified.

14. A seat made from sheet material and provided with a reinforcing-plate beneath the same, said seat having a plurality of circular perforations therein, the metal surrounding some of said perforations being 5 swaged downwardly to form eyelets extending through said plate and upset against the surface thereof, substantially as specified.

In testimony whereof I affix my signature in the presence of two witnesses.

ROBERT T. J. MARTIN.

Witnesses:
    THOS. H. MARTIN,
    J. B. HULL.